United States Patent
Kinoshita et al.

(10) Patent No.: US 6,387,425 B1
(45) Date of Patent: May 14, 2002

(54) METHOD FOR PRODUCING LOW POTASSIUM JUICE WITH IMPROVED TASTE AND PRODUCT THEREOF

(75) Inventors: Yuko Kinoshita; Toshio Kinoshita, both of Tokyo; Koji Katamune, Sakado; Takushi Goto, Urawa; Toshio Takizawa, Odawara, all of (JP)

(73) Assignee: Meiji Seika Kaisha Ltd., Tokyo (JP)

( * ) Notice: Subject to any disclaimer, the term of this patent is extended or adjusted under 35 U.S.C. 154(b) by 0 days.

(21) Appl. No.: 09/490,221

(22) Filed: Jan. 24, 2000

(51) Int. Cl.⁷ ............... A23L 1/015; A23L 1/29; A23L 1/304
(52) U.S. Cl. ............... 426/271; 426/2; 426/74; 426/590; 426/599
(58) Field of Search ............... 426/271, 590, 426/74, 599, 2

(56) References Cited

U.S. PATENT DOCUMENTS

| | | | | |
|---|---|---|---|---|
| 3,108,876 A | * | 10/1963 | Turken et al. | 426/271 |
| 3,801,717 A | * | 4/1974 | Huffman | 426/271 |
| 5,106,638 A | | 4/1992 | Siegers | 426/271 |
| 5,993,877 A | * | 11/1999 | Ohtake | 426/271 |

FOREIGN PATENT DOCUMENTS

| | | |
|---|---|---|
| EP | 0 323 667 | 7/1989 |
| EP | 0 339 540 A | 11/1989 |
| FR | 2 774 557 | 8/1999 |
| JP | 61-209573 A | 9/1986 |
| NL | 9200402 | * 3/1992 |

OTHER PUBLICATIONS

Derwent–acc–No.: 1989–328537, Hjokkaido togyo KK et al. JP 01244000 A patented Sep. 28, 1989 (abstract only).

S. Vibhakar et al, "The Clarification and Deacidification of Grape Juice by Ion–Exchange Resins", *J. Sci. FdAgric.,* vol. 17, pp. 488–490 (Nov. 1966).

AN 1999–229815, WPIDS Copyright, Derwent Information Ltd., of BR 9704147 A published 19990406.

*Patent Abstracts of Japan,* vol. 011, No. 043 (C–402), Feb. 7, 1987 of JP 61209573 (Nippon Terupen Kagaku), Sep. 17, 1986.

* cited by examiner

*Primary Examiner*—Helen Pratt
(74) *Attorney, Agent, or Firm*—Frishauf, Holtz, Goodman, Langer & Chick, P.C.

(57) ABSTRACT

A method for producing low potassium juice with improved taste. The process includes the steps of treating potassium-containing juice with a cation exchange resin to remove 90% or more of the potassium content in the juice and adding a calcium compound which is calcium carbonate in the form of solid. The juice produced has improved taste and nutritional balance. It is also good for patients suffering from kidney failure.

14 Claims, No Drawings

METHOD FOR PRODUCING LOW POTASSIUM JUICE WITH IMPROVED TASTE AND PRODUCT THEREOF

FIELD OF THE INVENTION

The present invention relates to a method for producing a low potassium juice with improved taste and more particularly to a method for producing a juice with improved taste by decreasing the concentration of potassium in the juice and adding a calcium compound thereto. Further, the present invention relates to a juice suitable for patients suffering from kidney failure who are allowed to take up limited amounts of potassium and to whom administration of calcium carbonate is necessary.

BACKGROUND OF THE INVENTION

In cells of animals inclusive of humans, potassium mainly exists in an intracellular liquid and in a pair with sodium which exists mainly in an extracellular liquid and plays an important role in maintaining the homeostasis of a living organism as one of major factor in the acid base equilibrium. However, since patients suffering from kidney failure have decreased functions of excreting potassium and of maintaining blood ion balance so that they tend to be suffered from hyperkalemia, hyperphosphatemia, or hypocalcemia. An extreme increase in serum potassium level may cause the stop of the heart function and, in the worst cases, fatal situation.

Therefore, patients with kidney failure are subjected to strict restriction on the uptake of potassium and, in particular, they cannot freely take fruit or vegetables containing potassium in large amounts. As described above, patients with kidney failure tend to be suffered from hyperphosphatemia or hypocalcemia, and hence administration of calcium carbonate to such patients is necessary. Further, in the case of those patients who are subjected to the restriction on the uptake of fruit and vegetables, there arises a new problem that the contents of meal are unbalanced and it is difficult to maintain a nutritional balance.

Treatment of juice with ion exchange resins itself is a technology which has been known for a long time. J. Sci. Food Agric. (1966), 17(11), 488–90 reports the use of cation and anion exchange resins in preventing the precipitation of algallol and adjustment of the acidity of a grape juice. Also, it has been reported a trial to adjust potassium ion in juices using the ion exchange resins (Japanese Patent Application Laid-open No. Sho 61-209573, Brazilian Patent Application Laid-open No. 9704147, European Patent Application Laid-open No. 0339540).

However, foods adjusted to decrease the amount of potassium ion with ion exchange resins by the prior art have not always been satisfactory in respect of health care purpose, taste, texture, nutritional balance, etc. In the technology described in Japanese Patent Application Laid-open No. Sho 61-209573, since a decrease in the potassium content results in a considerable deterioration in the taste of the juice, the amount of depotassification is restricted to 90% or less of the amount of potassium contained in the raw material juice. That is, the taste is maintained by allowing about 10% of potassium to remain. Further reduction in the content of potassium is not conducted.

According to the guideline used in Japan, patients under maintenance blood dialysis who receives dialysis 3 times a week are subjected to a strict restriction on the uptake of potassium to 1.5 g/day. In this case, if the amount of potassium in juice of fruit or of vegetable is reduced until it is suitable for drinking by patients with kidney failure, the acidity increases excessively and the taste is extremely aggravated so that a drink having a taste suitable as juice is not obtained.

Brazilian Patent Application Laid-open No. 9704147 and European Patent Application Laid-open No. 0339540 disclose methods for producing depotassified juice containing water-soluble calcium ions by using calcium type cation exchange resin in order to improve the degree of deterioration of the taste as described above. Brazilian Patent Application Laid-open No. 9704147 discloses the technology of exchanging potassium ions and sodium ions in juice with calcium ions using calcium type cation exchange resin.

However, the calcium type cation exchange resin is limited in the content of water-soluble calcium salt necessary for the adjustment so that exchange of a large amount of calcium ions is unrealistic and it is only possible to provide juice which contains a trace amount of calcium ions in the range where they are water-soluble as contained in beverages.

Since use of the calcium type cation exchange resins is unrealistic, European Patent Application Laid-open No. 0339540 discloses a method for producing low potassium juice using novel calcium type cation exchange resin. That is, it discloses a method for producing calcium containing juice using calcium type cation exchange resin composed of polystyrene resin having sulfon groups, crosslinked to 80% with divinylbenzene.

However, also in this case, there are technical barriers, that is the amount of potassium ions removed and volume of exchange by the calcium type cation exchange resin. Therefore, the prior art remains to provide juice still containing potassium ion in an amount of about 30% of the total amount of potassium ion contained before the treatment.

Moreover, nowadays when ion exchange technology has been improved greatly, a method for the decationation of juice by means of ion exchange membranes has also been used widely. However, juice, which has a high solid content, causes clogging of the membrane, so that a reduction in the amount of ion is limited to about one fifth of the cations contained in raw material juice.

As stated above, in the prior art, it has been known to provide juice by removal of potassium ions using cation exchange resin and optional addition of calcium by use of calcium type cation exchange resin. However, there has been a limitation in technology to remove a sufficient amount of potassium while retaining taste and exchange a large amount of calcium ions by use of calcium type cation exchange resin.

It is needless to say that taste is one of the important elements of food. Foods from which merely potassium has been removed are not satisfactory to patients suffering from chronic kidney failure who are compelled to be subjected to dietary control for a long period of time. This is a serious problem. However, scientific clarification of sense of taste of humans has not been made sufficiently yet and in actualities, new foods and new tastes have been developed by at random screening and tremendous efforts by food technicians.

The problem that treatment with cation exchange resin in order to decrease the potassium content results in a loss of vitamins contained in raw material juice, in particular vitamin C, in a considerable amount has been overlooked. One object of juice beverages from the nutritional viewpoint is to supplement vitamin C. In addition, vitamin C, which gives unique taste, is important for the taste of juice. This problem does not have to be neglected.

SUMMARY OF THE INVENTION

An object of the present invention is to solve the problems associated with the prior art as described above. More particularly, an object of the present invention is to provide a juice which not only contains a reduced amount of potassium but also has improved taste and nutritional balance so that it can be taken with good taste for patients who suffer from malfunction of kidney such as kidney failure. In addition it is intended for the therapy of patients with kidney failure, i.e., control of blood potassium ion as well as improvement and prevention of hypocalcemia and hyperphosphatemia with calcium carbonate.

As a result of intensive study and research in various fields with a view to achieving the above object, it has been found that the addition of a suitable amount of a calcium compound selected from calcium carbonate and calcium hydroxide in the form of a solid to fruit juice or vegetable juice, whose acidity has been increased excessively owing to reduction of the potassium content with the use of a cation exchange resin, results in neutralization of acidity and improvement in taste. Accordingly, there can be produced a wide variety of good tasting juice which can be used for the therapy of patients with kidney failure and for keeping a balance between potassium ions and phosphate ions in the blood.

Generally, for the neutralization of acid taste, addition of a basic compound is considered. However, addition of a basic substance containing potassium or sodium which has been removed from juice cannot be adopted for juice for patients suffering from kidney failure who are subjected to restriction on the uptake of potassium or sodium. Conventional technologies using calcium type ion exchange resins have limitations on the amount of potassium to be removed and the volume amount of calcium ion to be exchanged as described above.

On the other hand, as described in The Merck Index (12th ed., Merck & Co., Inc., pp271–272), calcium carbonate is a water-insoluble compound which has been used widely for animals or humans as a supplement agent for calcium ions and as an antioxidant. It has been widely administered to patients suffering from kidney failure for the purpose of suppressing the absorption of phosphoric acid as described below so that juice containing it is not only safe when taken by the patients but also is expected to exhibit a suppressing effect on the absorption of phosphoric acid.

In the conventional technologies, it has been tried to solve the problem of taste by the use of water-soluble calcium ions. In contrast thereto, the present inventors have found that the problem can be solved by the addition of water-insoluble calcium carbonate or sparingly water-soluble calcium hydroxide in the form of a solid. That is, various kinds of juice contain solids therein from fruit or vegetables and under this circumstance, the addition of calcium carbonate or calcium hydroxide in the form of a solid can neutralize excessive acidity, without deteriorating the taste. The present invention has been achieved based on this finding.

Since the potassium content differs depending on the kind of raw material juice, the amount of cation exchange resin and length of the contact time which are suited for the potassium content of each juice have been studied in order to produce many kinds of low potassium juice. As a result, the present inventors have found that juice from which sufficient, preferably 95% or more of the potassium contained in the raw material juice has been removed can be provided.

Further, the present inventors have completed the present invention having the great feature that has not been attained by the conventional technologies that the amount of calcium carbonate can be controlled in patients suffering from kidney failure. In other words, the present inventors have found that the addition of calcium carbonate or calcium hydroxide in the form of a solid to juice, which is obtained by sufficiently depotassifying fruit or vegetable juice with a cation exchange resin and has reduced taste, in amounts sufficient for improving the taste or necessary for the therapy of patients suffering from kidney failure, can simultaneously solve the problems of taste and provide a juice as a beverage for patients suffering from kidney failure.

Accumulation of phosphoric acid in the body is an important problem to patients suffering from kidney failure and it has been an important daily subject to limit the uptake of food containing phosphoric acid and suppress the absorption of phosphoric acid. That is, a general doctors' manual in the U.S., The Merck Manual (5th ed., Merck Sharp & Dohme Research Laboratories, pp 1551–1652, esp. pp 1573 (1987) describes that in patients suffering from kidney failure abnormal metabolisms of calcium ion, phosphate ion, parathyroid hormone and vitamin D in blood occur, which when left to stand without any treatment will cause hypocalcemia and hyperphosphatemia, and that in daily diet therapy for patients suffering from kidney failure, food containing potassium must be avoided and calcium carbonate, an absorption suppressor for phosphoric acid, must be taken.

Therefore, it is reasonable to add calcium carbonate to low potassium juice in order to solve such a problem. In fact, in the therapy of hyperphosphatemia with an absorption suppressor for phosphoric acid, aluminum hydroxide and aluminum carbonate have been conventionally used. Currently, to avoid toxicity, calcium carbonate (0.5 to 1.5 g) is administered orally.

When treating juice with cation exchange resin, a considerable amount of vitamin C contained therein is lost. One object of taking juice from the viewpoint of nutrition is to supplement vitamin C so that the loss of it is a problem which must not be overlooked. It is easy to add and supplement vitamin C in an amount corresponding to the lost vitamin C. That is, nutritional value can be increased by supplementing the vitamin C which has been lost during the treatment with cation exchange resin such that the juice can contain the same level of vitamin C as that before the treatment.

Accordingly, the present invention provides a method for producing a low potassium juice having a good taste and a balanced nutrition for patients suffering from kidney failure, which comprises treating a potassium-containing juice with a cation exchange resin to reduce the potassium content to $\frac{1}{10}$ or less, preferably $\frac{1}{20}$ or less, as compared to the raw material juice, adding a calcium compound selected from the group consisting of calcium carbonate and calcium hydroxide in the form of a solid and, if necessary, further adding vitamin C.

The first aspect of the present invention provides a method for producing a low potassium juice with improved taste, comprising the steps of treating a potassium-containing juice with a cation exchange resin to remove 90% or more of the potassium content in the juice and adding a calcium compound selected from the group consisting of calcium carbonate and calcium hydroxide in the form of a solid.

The second aspect of the present invention provides a method for producing a low potassium juice, wherein 95% or more of the potassium content in the juice is removed.

The third aspect of the present invention provides a method for producing a low potassium juice, wherein the juice is selected from the group consisting of a fruit juice such as orange juice, or apple juice, a vegetable juice or a mixture of a vegetable juice and a fruit juice.

The fourth aspect of the present invention provides a method for producing a low potassium juice, wherein the cation exchange resin is a cation exchange resin adjusted to an H type.

The fifth aspect of the present invention provides a method for producing a low potassium juice, wherein the treatment is carried out in a column process using a cation exchange resin preliminarily adjusted to an H type.

The sixth aspect of the present invention provides a method for producing a low potassium juice, wherein vitamin C is added in addition to the calcium compound.

The seventh aspect of the present invention provides a method for producing a low potassium juice, wherein a calcium compound is added in an amount of 0.5 to 20 g/L of juice and a low potassium juice suitable for patients suffering from kidney failure is provided.

The eighth aspect of the present invention provides a low potassium juice for patients suffering from kidney failure, wherein the content of potassium is 10% or less compared to raw material juice and the content of a calcium compound is 0.5 to 20 g/L.

DETAILED DESCRIPTION OF THE INVENTION

The raw material juice used in the present invention includes all types of juice, for example, vegetable juice, fruit juice, a mixture of vegetable juice and fruit juice, etc. In particular, orange juice, apple juice and a mixture of a vegetable juice and a fruit juice are preferably used.

The cation exchange resin used in the present invention may be any of commercially available cation exchange resins, which are adjusted or regenerated to H type by a conventional method before use. The treatment with cation exchange resin may be a batch process or a column process. When the treatment is carried out in a batch process, about 20 to 1,000 g of cation exchange resin, which is regenerated and then dried, per 1,000 mL of raw material juice is provided and added to the raw material juice, followed by stirring for 20 minutes or more, usually about 30 minutes and filtration.

On the other hand, when the treatment is carried out in a column process, a column packed with about 100 to 500 mL by the volume of regenerated cation exchange resin per 1,000 mL of raw material juice is provided and the raw material juice is charged therein and allowed to pass therethrough over 0.5 to 2.0 hours.

Thus, the treatment with cation exchange resin under the above-described conditions can remove 90% or more of the potassium content in the raw material juice and therefore can reduce the potassium content in the raw material juice to 1/10 or less of the original content. Further, as claimed in claim 2, the potassium content may be removed 95% or more and therefore the potassium content may be reduced to 1/20 or less of the original content depending on the kind of juice, amount of the cation exchange resin used, the contact time in which the juice contacts with the cation exchange resin and other factors. In view of productivity and efficiency of ion exchange, the treatment by a column process is preferred. In case it is intended that the juice is taken by patients who are subjected to restriction on the uptake of potassium, the concentration of potassium in juice is recommended to be 0 to 7 mmol/L.

Further, low potassium juice with improved taste, acid taste, and nutrition can be produced by adding to the juice after the treatment with a cation exchange resin a calcium compound selected from the group consisting of calcium carbonate and calcium hydroxide in the form of solid in an amount of 0.5 to 20 g/L, preferably to such an extent that the pH value of the raw material juice is not returned completely, and if necessary adding vitamin C in an amount of 0.2 to 10 g/L of juice.

Depending on the balance between phosphate ion concentration and potassium ion concentration in blood, patients suffering from kidney failure can take 0.5 to 1.5 g a day of calcium carbonate.

The low potassium juice provided by the present invention may, if necessary, be blend, within the range where no adverse effect to the function of kidney is observed, with various vitamins, glucides, dyestuffs, perfumes to impart variation in taste. Of course, the juice can be provided as it is as a beverage. However, if necessary, it may be subjected to molding into powder or granules in addition to the steps of concentration, drying, and granulation. The product in the form of powder or granules can be taken as it is or returned to a liquid state by addition of water, or added to other food.

The eighth aspect of the present invention provides a low potassium juice for patients suffering from kidney failure, wherein the content of potassium is 10% or less compared to raw material juice and the content of a calcium compound and 0.5 to 20 g/L. The low potassium juice of the eighth aspect of the present invention can be produced by various methods.

According to the present invention, deterioration of taste and increase in acidity due to a decrease in the potassium content can be prevented by the addition of calcium carbonate or calcium hydroxide, and further, by addition of vitamin C so that vegetable juice, fruit juice, or a mixture of a vegetable juice and a fruit juice having improved taste and balanced nutrition can be provided.

The low potassium juice provided by the present invention are suitable for patients suffering from malfunction of in kidney, such as kidney failure, who are subjected to restriction on the uptake of potassium. Further, the low potassium juice of the present invention can be provided for the prevention of hyperphosphatemia in patients suffering from kidney failure.

EXAMPLES

Hereafter, the present invention will be described in detail referring to example. However, the present invention is not limited thereto.

In the examples, the cation exchange resin used was commercially available cation exchange resin, Dowex 50W-X4 or SK1B (MITSUBISHI DIA ION Co., LTD.) preliminarily regenerated by the following procedures.

That is, purified water was added to 500 g of the cation exchange resin and the mixture was stirred to sufficiently wash the resin. To the drained resin was added 500 mL of ethanol and the mixture was stirred for 30 minutes. Then, ethanol was removed by filtration. After the washing operation with ethanol was repeated 3 times, ethanol was changed to purified water to conduct washing. To the water-washed resin was added 500 mL of 1M sodium hydroxide solution and the mixture was stirred for 30 minutes. Thereafter, the resin was recovered by filtration. After the operation of the treatment with sodium hydroxide solution was repeated 5 times, the resin was washed with water, until the washing became neutral.

Then, the washed resin was packed in a column, through which was passed 2,500 mL of 3 M hydrochloric acid solution and further the column was washed with water until the washing became neutral. After the above operations, the resin as it was or after sufficiently drying it by suction filtration, served as regenerated H type cation exchange resin.

Example 1 Production Method in a Batch Process

In 1,000 mL of each of commercially available 100% orange juice, 100% apple juice, 100% grapefruit juice, and 100% grape juice as a raw material juice was added the dried regenerated H type cation exchange resin in the amount shown in Table 1 and the mixture was stirred for 30 minutes to adsorb potassium. Thereafter, to each juice after filtration were added calcium carbonate in the solid form as they were in the amount shown in Table 1. Further, to each juice was further added vitamin C such that its concentration was equivalent to that of the juice before the treatment as measured by a titration method. The mixture was stirred to dissolve the additions thereby producing low potassium juice, final product.

Before the treatment with the cation exchange resin and before the addition of vitamin C, the concentration of potassium in juice was measured by using Automated Electrolyte Analyzer EA05 (A and T) and the pH of juice was measured by using commercial pH meter. The results are shown in Table 1.

As can be seen from the results, fruit juice having a potassium content reduced to $1/10$ or $1/20$ of the original one were produced.

TABLE 1

Results of treatment of various kinds of juice with ion exchange resin

| | Orange juice | Apple juice | Grapefruit juice | Grape juice |
|---|---|---|---|---|
| Raw material juice (mL) | 1,000 | 1,000 | 1,000 | 1,000 |
| Amount of resin used (g) | 50 | 40 | 50 | 25 |
| Concentration of potassium (mmol/L) | | | | |
| Before treatment | 48.0 | 25.7 | 38.6 | 7.6 |
| After treatment | 2.5 | 0.8 | 2.1 | 0.6 |
| Potassium removal ratio (%) | 95.0 | 96.2 | 94.7 | 92.3 |
| pH | | | | |
| Before treatment | 3.81 | 4.05 | 3.30 | 3.00 |
| After treatment | 2.18 | 2.28 | 2.02 | 2.07 |
| Amount of calcium carbonate added (g/L) | 2.61 | 2.08 | 3.65 | 1.56 |

Example 2 Production Method in a Batch Process

To 1,000 mL of a commercially available green-yellow vegetable juice (raw material comprising: celery, parsley, watercress, cabbage, radish, spinach, or trefoil) was added 700 g of a regenerated cation exchange resin and a treatment with a cation exchange resin was carried out in the same manner as in Example 1 to obtain a vegetable juice from which potassium was removed by adsorption.

Then, to the vegetable juice was added calcium carbonate in the form of solid as it was in the amount shown in Table 2 and thereafter vitamin C was added to the vegetable juice such that the concentration was equivalent to that before the treatment as measured by a titration method. The mixture was stirred to dissolve the additives thereby producing low potassium juice, final product.

Before the treatment with the cation exchange resin and before the addition of vitamin C, the concentration of potassium in juice and the pH of juice were measured in the same manner as in Example 1. The results are shown in Table 2. As can be seen from the results, green-yellow vegetable juice having a potassium content reduced to $1/20$ of the original one were produced.

TABLE 2

Results of treatment of vegetable juice with ion exchange resin

| | |
|---|---|
| Amount of juice used (mL) | 1,000 |
| Amount of resin used (g) | 700 |
| Concentration of potassium (mmol/L) | |
| Before treatment | 128.7 |
| After treatment | 6.2 |
| Potassium removal ratio (%) | 95.2 |
| pH | |
| Before treatment | 4.01 |
| After treatment | 0.99 |
| Amount of calcium carbonate added (g/L) | 13.3 |

Example 3 Production Method in a Column Process

To 250 L of 5-fold concentrated orange fruit juice (Cargil Japan) was added 1,000 L of deionized water and the mixture was stirred and mixed well to prepare 100% orange juice. To 180 L of 7-fold concentrated apple fruit juice (Nagano Kosan) was added 1,070 L of deionized water and the mixture was stirred and mixed well to prepare 100% apple juice.

Further, 85 L of 6-fold concentrated carrot squeezed juice (Mildura), 7 L of 10-fold concentrated tomato squeezed juice (Nagano Sanyo Foods), 10 L of 6-fold concentrated spinach squeezed juice (Nagano Sanyo Foods), 38 L of 5-fold concentrated orange fruit juice (Cargil Japan), 43 L of 7-fold concentrated transparent apple fruit juice (Nagano Sanyo Foods), 31 L of 4-fold concentrated turbid apple fruit juice (Nagano Sanyo Foods) and 1,036 L of deionized water were stirred and mixed well to prepare a mixture of a vegetable juice and a fruit juice.

The prepared juice used as raw materials were passed through a cylindrical column of 2 m in height and 55 cm in diameter packed with 250 L of dry regenerated H type cation exchange resin SK1B (Mitsubishi Dia Ion) from an upper part thereof over 1 hour, and then solid calcium carbonate were added as they were in the amount shown in Table 3 to produce low potassium juice, final products.

Before and after the treatment with the cation exchange resin, the concentration of potassium in juice were measured using Polarized Zeeman atomic-absorption spectrometer Z-5300 (Hitachi, Ltd.). The results are shown in Table 3. As can be seen from the results, juices having a potassium content reduced to $1/100$ or less of the original one were produced.

TABLE 3

Results of cation exchange resin treatment of various juices in a column process

| | Orange juice | Apple juice | a mixture of vegetable juice and fruit juice |
|---|---|---|---|
| Raw material juice (L) | 1,250 | 1,250 | 1,250 |
| Amount of resin used (L) | 250 | 250 | 250 |
| Concentration of potassium (mmol/L) | | | |
| Before treatment | 80.5 | 29.7 | 59.5 |
| After treatment | 0.16 | 0.05 | 0.15 |
| Potassium removal ratio (%) | 99.8 | 99.8 | 99.8 |
| pH | | | |
| Before treatment | 3.80 | 3.68 | 4.29 |
| After treatment | 1.97 | 2.30 | 1.79 |
| After addition of calcium carbonate | 3.07 | 3.22 | 3.52 |
| Addition amount of calcium carbonate | | | |
| (Kg) | 3.13 | 3.38 | 1.0 |
| (g/L) | 2.5 | 2.7 | 0.8 |

Test Example 1

For various low potassium juice prepared during the steps in Example 3 or as final products, organoleptic tests were carried out before and after addition of calcium carbonate. The tests were carried out by a panel of specialists who had excellent taste discrimination ability. Scores were as follows.

+2: taste was felt strongly.
+1: taste was felt fairly.
0: unclear whether or not taste was felt.
−1: taste was felt not so much.
−2: almost no taste was felt.

The results are shown in Table 4.

TABLE 4

Evaluation of taste before and after addition of calcium carbonate

| Kind of juice | Before addition | After addition |
|---|---|---|
| Orange juice | −1.4 | +1.6 |
| Apple juice | −1.8 | +1.7 |
| a mixture of vegetable juice and fruit juice | −1.7 | +1.4 |

Example 4

To 1,250 L of low potassium orange juice (pH 2.05) prepared in accordance with the method described in Example 3 except that no calcium carbonate was added was added 2.8 kg of solid calcium hydroxide as they were to produce low potassium orange juice (pH 3.25), final product. The produced low potassium orange juice were evaluated in the same manner as the special panel described in Test Example 1. This confirmed that the juice had similar taste to that of the low potassium orange juice to which was added calcium carbonate as described in Example 3.

Test Example 2

200 mL of low potassium orange juice having a potassium concentration of 2.5 mmol/L prepared by the method in accordance with that in Example 1 was given to each of patients suffering from kidney failure who were receiving the same dialysis therapy once at the time of dialysis and once at non-dialysis time. The change in blood potassium level in the patients before and after the uptake was measured using Automated Electrolyte Analyzer EA05 (A and T). Table 5 shows the measured values obtained.

From the results, it revealed that the low potassium orange juice produced by the present invention caused no change in blood potassium level when taken by patients suffering from kidney failure so that it can be given to the patients who suffer from kidney failure safely.

TABLE 5

Change in blood potassium level when low potassium orange juice is given

| | Blood potassium level (mmol/L) | | | |
|---|---|---|---|---|
| | Upon dialysis | | Upon non-dialysis | |
| Patient | 1 hour before uptake | 1 hour after uptake | 1 hour before uptake | 1 hour after uptake |
| A | 5.5 | 3.5 | 5.5 | 5.5 |
| B | 4.9 | 4.3 | 4.9 | 4.9 |
| C | 4.5 | 3.3 | 4.5 | 4.5 |

What is claimed is:

1. A method for producing low potassium juice with improved taste for patients suffering from kidney failure, consisting essentially of
    (a) treating a potassium-containing juice selected from the group consisting of a vegetable juice, a fruit juice and a mixture of a vegetable juice and a fruit juice with an H type cation exchange resin to remove 90% or more of the potassium content in the juice so that the resultant treated juice has a pH of 1.79 to 2.30, and
    (b) adding a calcium compound which is calcium carbonate in an amount of 0.5 to 20 g/L of juice, in the form of a solid, to provide a juice with a pH of 3.07 to 3.52.

2. The method for producing low potassium juice as claimed in claim 1, wherein 95% or more of the potassium content in the juice is removed.

3. The method for producing low potassium juice as claimed in claim 2, wherein the juice is from a fruit selected from the group consisting of orange and apple.

4. The method for producing low potassium juice as claimed in claim 1, wherein the juice is selected from the group consisting of a vegetable juice, a fruit juice and a mixture of a vegetable juice and a fruit juice.

5. The method for producing low potassium juice as claimed in claim 1, wherein the cation exchange resin is cation exchange resin adjusted to H type.

6. The method for producing low potassium juice as claimed in claim 1, wherein the treatment with the H type cation exchange resin is carried out in a column.

7. The method for producing low potassium juice as claimed in claim 1, which further comprises adding vitamin C in addition to the calcium compound.

8. The method for producing low potassium juice as claimed in claim 1, wherein the juice is from a fruit selected from the group consisting of orange and apple.

9. The method for producing low potassium juice as claimed in claim 1, wherein the juice is from at least one fruit or vegetable selected from the group consisting of grapefruit, grape, celery, carrot, parsley, watercress, cabbage, radish, spinach, trefoil and tomato.

10. A low potassium juice with improved taste and for patients suffering from kidney failure consisting essentially of (i) potassium in an amount of 10% or less relative to a raw material juice and (ii) a calcium compound which is calcium carbonate in an amount of 0.5 to 20 g/L of juice, the low potassium juice being produced by treating a potassium-containing juice selected from the group consisting of a vegetable juice, a fruit juice and a mixture of a vegetable juice and a fruit juice with an H type cation exchange resin to remove 90% or more of the potassium content in the juice so that the resultant treated juice has a pH of 1.79 to 2.30 and adding calcium carbonate in the form of a solid, to provide a juice with a pH of 3.07 to 3.52.

11. The juice as claimed in claim 10, wherein the potassium is in an amount of $1/20$ or less relative to a raw material juice.

12. The juice as claimed in claim 11, which further comprises vitamin C.

13. The juice as claimed in claim 12, wherein the vitamin C is in an amount of 0.2 to 10 g/L of juice.

14. The juice as claimed in claim 10, wherein the juice is from at least one fruit or vegetable selected from the group consisting of orange, apple, grapefruit, grape, celery, carrot, parsley, watercress, cabbage, radish, spinach, trefoil and tomato.

* * * * *